US012709561B2

(12) United States Patent
Piironen et al.

(10) Patent No.: US 12,709,561 B2
(45) Date of Patent: Aug. 18, 2026

(54) MEASURING AND CONTROLLING ORGANIC MATTER IN WASTE WATER STREAM

(71) Applicant: Kemira Oyj, Helsinki (FI)

(72) Inventors: Marjatta Piironen, Espoo (FI); Sakari Halttunen, Helsinki (FI); Iiris Joensuu, Espoo (FI); Anne Mäki, Helsinki (FI)

(73) Assignee: Kemira Oyj, Helsinki (FI)

( * ) Notice: Subject to any disclaimer, the term of this patent is extended or adjusted under 35 U.S.C. 154(b) by 834 days.

(21) Appl. No.: 17/293,113

(22) PCT Filed: Nov. 14, 2019

(86) PCT No.: PCT/FI2019/050813

§ 371 (c)(1),
(2) Date: May 12, 2021

(87) PCT Pub. No.: WO2020/099723

PCT Pub. Date: May 22, 2020

(65) Prior Publication Data

US 2022/0009807 A1 Jan. 13, 2022

(30) Foreign Application Priority Data

Nov. 14, 2018 (FI) ..................................... 20185963

(51) Int. Cl.
*C02F 1/52* (2023.01)
*C02F 1/66* (2023.01)
(Continued)

(52) U.S. Cl.
CPC .............. *C02F 1/5209* (2013.01); *C02F 1/66* (2013.01); *C02F 3/006* (2013.01);
(Continued)

(58) Field of Classification Search
None
See application file for complete search history.

(56) References Cited

U.S. PATENT DOCUMENTS 9,517,954 B2 12/2016 Konishi et al.
10,281,383 B2 5/2019 Goldblatt
(Continued)

FOREIGN PATENT DOCUMENTS

CN 101937197 A 1/2011
CN 103118755 A 5/2013
(Continued)

OTHER PUBLICATIONS

MT of WO 2011013531 (Year: 2011).*
(Continued)

*Primary Examiner* — Peter Keyworth
(74) *Attorney, Agent, or Firm* — Espatent Oy

(57) ABSTRACT

A method is disclosed for monitoring and controlling treatment of a waste water stream. The method includes measuring UV absorbance of a waste water influent and/or waste water effluent, measuring turbidity of the waste water influent and/or waste water effluent, and determining the concentration of dissolved organics in the waste water influent and/or waste water effluent based on the measured UV absorbance. The method includes controlling the dosing of at least one coagulant to the waste water influent based on the measured UV absorbance and/or the determined concentration of the dissolved organics, and optionally based on the measured turbidity, and optionally controlling the dosing of at least one flocculant to the waste water influent based on the measured turbidity.

30 Claims, 12 Drawing Sheets

(51) Int. Cl.
*C02F 3/00* (2023.01)
*C02F 103/28* (2006.01)

(52) U.S. Cl.
CPC .... *C02F 2103/28* (2013.01); *C02F 2209/001* (2013.01); *C02F 2209/003* (2013.01); *C02F 2209/06* (2013.01); *C02F 2209/08* (2013.01); *C02F 2209/10* (2013.01); *C02F 2209/11* (2013.01); *C02F 2209/18* (2013.01)

(56) References Cited

U.S. PATENT DOCUMENTS

| | | | | |
|---|---|---|---|---|
| 2011/0253625 | A1* | 10/2011 | Takeda | C02F 3/109 210/615 |
| 2011/0259748 | A1* | 10/2011 | Smith | C02F 1/008 204/555 |
| 2013/0062288 | A1* | 3/2013 | Spani | E03F 5/14 210/709 |
| 2013/0153510 | A1 | 6/2013 | Jansson et al. | |
| 2014/0131259 | A1 | 5/2014 | Goldblatt | |
| 2014/0277746 | A1 | 9/2014 | Konishi et al. | |
| 2016/0376166 | A1 | 12/2016 | Lawryshyn et al. | |
| 2019/0194048 | A1* | 6/2019 | Wikramanayake | C02F 3/1226 |

FOREIGN PATENT DOCUMENTS

| | | | | |
|---|---|---|---|---|
| CN | 103889900 | A | 6/2014 | |
| CN | 106915810 | A | 7/2017 | |
| GB | 2208856 | A | 4/1989 | |
| JP | H10118411 | A | 5/1998 | |
| JP | 2007245078 | A | 9/2007 | |
| JP | 4429207 | B2 | 3/2010 | |
| JP | 2012-196628 | A | 10/2012 | |
| RU | 2454698 | C2 | 6/2012 | |
| RU | 2660367 | C2 | 7/2018 | |
| WO | 2009002192 | A1 | 12/2008 | |
| WO | WO-2011013531 | A1 * | 2/2011 | C02F 3/1273 |
| WO | 2014078382 | A1 | 5/2014 | |
| WO | 2017168054 | A1 | 10/2017 | |

OTHER PUBLICATIONS

Office Action issued on Jan. 23, 2023, by the Russian Patent Office in corresponding Russian Patent Application No. 2021115903/05(033540), and an English Translation of the Office Action. (15 pages).

Office Action issued on Aug. 17, 2023, by the Brazilian Patent Office in corresponding Brazilian Patent Application No. BR112021008727-3. (4 pages).

Ratnaweera et al., "State of the Art of Online Monitoring and Control of the Coagulation Process", Water, Dec. 1, 2015, vol. 7, No. 12, pp. 6574-6597, XP055421768.

Office Action (Communication) issued on Oct. 6, 2022, by the European Patent Office in corresponding European Patent Application No. 19 813 068.4. (7 pages).

Notification of the First Office Action issued on Nov. 1, 2022, by the Chinese Patent Office in corresponding Chinese Patent Application No. 201980075206.1, and an English Translation of the Office Action. (33 pages).

Finnish Search Report dated Jun. 7, 2019, issued by the Finnish Patent and Registration Office in the corresponding Finnish Patent Application No. 20185963.

International Search Report (PCT/ISA/210) and Written Opinion (PCT/ISA/237) mailed on Jan. 7, 2020, by the European Patent Office as the International Searching Authority for International Application No. PCT/FI2019/050813.

Zhou X. et al. Modem Detection Technology. Beijing; Higher Education Press, Jan. 2004. ISBN 7-04-013030-0.

* cited by examiner

Influent

Coagulant

Polymer

Separation unit

UV-abs

Turbidity

C

Effluent

*Fig. 1a*

MEASURING AND CONTROLLING ORGANIC MATTER IN WASTE WATER STREAM

FIELD OF THE INVENTION

The present invention relates to monitoring a waste water stream, and more particularly to a method and apparatus for controlling treatment of waste water originating from a pulp production process.

BACKGROUND ART

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Chemical oxygen demand (COD) indicates the amount of oxygen that can be consumed by reactions in a solution. It may be expressed in mass of oxygen consumed over a volume of solution (mg/L). COD can be used to quantify the amount of oxidizable pollutants or organics (organic matter) in water.

In waste water treatment, environmental regulations for the chemical oxygen demand (COD) are tightening globally. While easily degradable organics may be removed from the waste water by biological waste water treatment, the amount of recalcitrant organics ("hard COD") in waste water effluent still often exceeds environmental limits. At the moment, COD is typically monitored by manual measurements. This is not enough for cost efficient dosing of chemicals to the waste water. Chemicals may be fed to the waste water stream as constant dosage (mg/L) or as constant flow (L/s). This does not ensure that COD is under release limit in the waste water effluent.

SUMMARY

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings in which FIGS. 1*a*, 1*b*, 2*a*, 2*b*, 3*a*, 3*b*, 4*a*, 4*b* and 5 illustrate exemplary embodiments;

DETAILED DESCRIPTION OF EMBODIMENTS

Figure 1B:
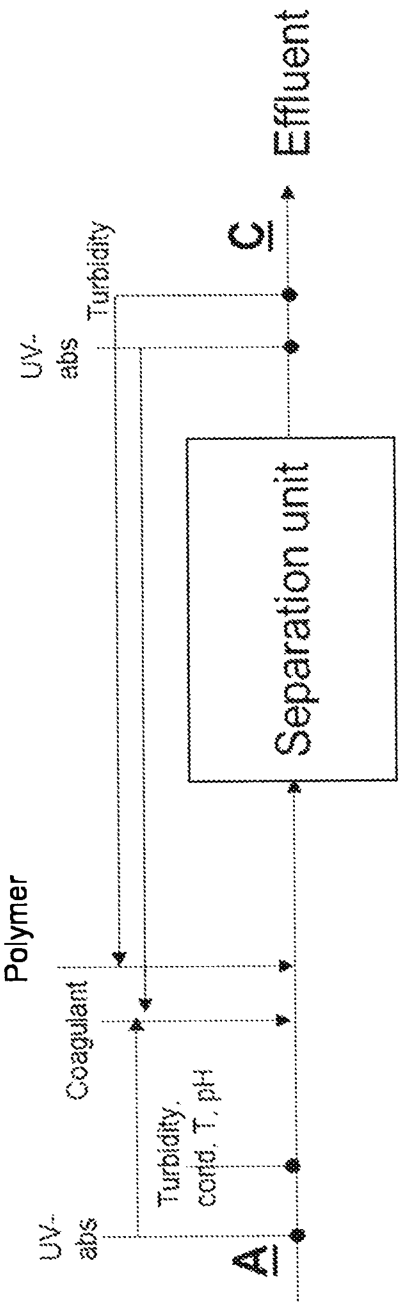

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

An embodiment discloses a method and apparatus for monitoring and controlling treatment of a waste water stream originating from a pulp production process. The waste water stream is subjected to at least one biological and/or chemical treatment step. The method comprises measuring UV absorbance of a waste water influent and/or waste water effluent, and measuring turbidity of the waste water influent and/or waste water effluent. The method further comprises determining the concentration of dissolved organics (i.e. dissolved organic matter) in the waste water influent and/or waste water effluent based on the measured UV absorbance, controlling the dosing of at least one coagulant to the waste water influent on the basis of the measured UV absorbance and/or the determined concentration of the dissolved organics, and optionally on the basis of the measured turbidity, and optionally controlling the dosing of at least one flocculant to the waste water influent on the basis of the measured turbidity.

In an embodiment, the measuring of the UV absorbance and turbidity takes place from waste water effluent obtained from a tertiary treatment in a separation unit of a biologically and chemically treated waste water influent, and the dosing of the at least one coagulant and optionally the dosing of the at least one flocculant takes place downstream from a secondary treatment in a sedimentation unit of a biologically treated waste water influent and upstream from the tertiary treatment.

In an embodiment, the measuring of the UV absorbance and turbidity takes place from waste water influent obtained from a secondary treatment in a sedimentation unit of a biologically treated waste water influent, and the dosing of the at least one coagulant and optionally the dosing of the at least one flocculant takes place downstream from the secondary treatment and upstream from a tertiary treatment in a separation unit of a biologically and chemically treated waste water influent.

In an embodiment, the method comprises conducting a sample of a biologically and chemically treated waste water influent to a settling vessel, measuring turbidity of the sample to obtain an initial turbidity value, and allowing particles in the sample to settle in the settling vessel for a selected settling time. After the selected settling time, the method comprises measuring UV absorbance and settled turbidity from a clarified portion of the sample, determining the concentration of dissolved organics in the clarified portion of the sample based on the measured UV absorbance, controlling the dosing of at least one coagulant to the biologically treated waste water influent on the basis of the measured UV absorbance and/or the determined concentration of the dissolved organics, and optionally on the basis of the settled turbidity, and optionally controlling the dosing of at least one flocculant to the biologically treated waste water influent on the basis of the settled turbidity, a separation efficiency in the settling vessel, and/or a settling velocity in the settling vessel.

In an embodiment, the sample is conducted from a point located downstream from a secondary treatment in a sedimentation unit of a biologically treated waste water influent, and upstream from a tertiary treatment in a separation unit of the biologically and chemically treated waste water influent, and the dosing of the at least one coagulant and optionally the dosing of the at least one flocculant takes place downstream from the secondary treatment and upstream from the point from where the sample is conducted to the settling vessel.

In an embodiment, the method comprises calculating the separation efficiency in the settling vessel based on a difference between the initial turbidity and the settled turbidity, calculating the settling velocity in the settling vessel by dividing the difference between the initial turbidity and the settled turbidity with the settling time, and controlling the dosing of the at least one coagulant and/or flocculant to the waste water influent on the basis of the calculated separation efficiency and/or the calculated settling velocity.

In an embodiment, the method comprises estimating a separation efficiency of the separation unit based on the calculated separation efficiency in the settling vessel and/or the calculated settling velocity in the settling vessel.

In an embodiment, the method comprises predetermining a correlation factor or function between the settled turbidity in the settling vessel and the turbidity of the waste water effluent, and predicting the turbidity of the waste water effluent based on the settled turbidity measured from the settling vessel, by using the predetermined correlation factor or function.

In an embodiment, the determining of the concentration of the dissolved organics is carried out by using a predetermined calibration equation or by comparing the measured UV absorbance to a predetermined calibration curve.

In an embodiment, the UV absorbance is measured at a single wave length or at a very narrow wave length range (e.g. a narrow wave length range or single wave length that is within 200-400 nm, preferably within 250-350 nm). The single wave length or the narrow wave length range may be selected based on the assumed concentration of the waste water influent and/or effluent (the wave length(s) that are assumed to generate an intensity of the UV absorbance measurable by a UV absorbance sensor or probe). Longer wave lengths enable measuring lower intensities, i.e. determining higher concentrations of dissolved organics. Alternatively, the length of the optical path may be adjusted to determine higher concentrations of dissolved organics by means of the UV absorbance measurement.

In an embodiment, the particles in the sample are allowed to settle in the settling vessel such that the turbidity of the sample does not change markedly any more after the selected settling time.

In an embodiment, the method comprises measuring a pH value of the biologically treated waste water influent obtained from the secondary treatment, measuring a pH value of a biologically and chemically treated waste water influent downstream from the secondary treatment and upstream from the tertiary treatment, measuring a pH value of the waste water effluent obtained from the tertiary treatment (or from the secondary treatment), and/or measuring a pH value of a clarified portion of a settled waste water sample in a settling vessel. If required, the method comprises controlling the dosing of at least one pH adjustment chemical and/or coagulant to the waste water influent, and/or controlling the dosing of at least one pH adjustment chemical to the waste water effluent, on the basis of a measured pH value.

In an embodiment, the method comprises determining the total organic matter concentration in the waste water influent and/or effluent based on the measured UV absorbance, the determined concentration of the dissolved organics and/or the turbidity of the waste water influent and/or effluent.

In an embodiment, the method is a continuous method, an automated method and/or a computerized method.

In an embodiment, the measuring of the UV absorbance and turbidity takes place from waste water effluent obtained from a secondary treatment in a sedimentation unit of a biologically and chemically treated waste water influent, and the dosing of the at least one coagulant and optionally the dosing of the at least one flocculant takes place upstream from the secondary treatment.

In an embodiment, the measuring of the UV absorbance and turbidity takes place from biologically treated waste water influent upstream from a secondary treatment in a sedimentation unit of a biologically treated waste water influent and upstream from the dosing of the coagulant and flocculant, and the dosing of the at least one coagulant and optionally the dosing of the at least one flocculant takes place upstream from the secondary treatment.

In an embodiment, the method comprises conducting a sample of a biologically and chemically treated waste water influent to a settling vessel, measuring turbidity of the sample to obtain an initial turbidity value, and allowing particles in the sample to settle in the settling vessel for a selected settling time. After the selected settling time, UV absorbance and settled turbidity are measured from a clarified portion of the sample, and the concentration of dissolved organics in the clarified portion of the sample is determined based on the measured UV absorbance. The dosing of at least one coagulant to the waste water influent is controlled on the basis of the measured UV absorbance and/or the determined concentration of the dissolved organics, and optionally on the basis of the settled turbidity, and optionally the dosing of at least one flocculant to the waste water influent is controlled on the basis of the settled turbidity, a separation efficiency in the settling vessel, and/or a settling velocity in the settling vessel. Herein, the sample is conducted from a point located upstream from a secondary treatment in a sedimentation unit of a biologically treated waste water influent, and downstream from the dosing of the coagulant and flocculant, wherein the dosing of the at least one coagulant and optionally the dosing of the at least one flocculant takes place upstream from the secondary treatment and upstream from the point from where the sample is conducted to the settling vessel.

In an embodiment, an apparatus is disclosed that is configured to perform the method. The apparatus comprises a first optical measurer configured to measure UV absorbance of a waste water influent and/or waste water effluent, a second optical measurer configured to measure turbidity of the waste water influent and/or waste water effluent, a processor configured to determine the concentration of dissolved organics in the waste water influent and/or waste water effluent based on the measured UV absorbance, and a controller configured to control the dosing of at least one coagulant to the waste water influent on the basis of the measured UV absorbance and/or the determined concentration of the dissolved organics, and optionally on the basis of the measured turbidity, and optionally to control the dosing of at least one flocculant to the waste water influent on the basis of the measured turbidity.

In an embodiment, the first optical measurer is configured to measure UV absorbance from waste water effluent obtained from tertiary treatment of biologically and chemically treated waste water influent, the second optical measurer is configured to measure turbidity from the waste water effluent obtained from the tertiary treatment, and the controller is configured to control the dosing of the at least one coagulant, and optionally the dosing of the at least one flocculant, downstream from secondary treatment in a sedimentation unit of the biologically treated waste water influent and upstream from the tertiary treatment.

In an embodiment, the first optical measurer is configured to measure UV absorbance from waste water influent obtained from secondary treatment in a sedimentation unit of biologically treated waste water influent, and the controller is configured to control the dosing of the at least one coagulant, and optionally the dosing of the at least one flocculant, downstream from the secondary treatment and upstream from the tertiary treatment of a biologically and chemically treated waste water influent.

In an embodiment, the apparatus comprises sampling means to conduct a sample of a biologically and chemically treated waste water influent to a settling vessel, wherein the first optical measurer is configured to measure UV absorbance from a clarified portion of the sample in the settling vessel after a selected settling time, and the second optical measurer is configured to measure initial turbidity of the sample to obtain an initial turbidity value, wherein the second optical measurer is configured to measure settled turbidity from a clarified portion of the sample in the settling vessel after the selected settling time. The processor is configured to determine the concentration of the dissolved organics in the sample based on the measured UV absorbance, and the controller is configured to control the dosing of at least one coagulant to the waste water influent is controlled on the basis of the measured UV absorbance and/or the determined concentration of the dissolved organics, and optionally on the basis of the settled turbidity, and optionally the dosing of at least one flocculant to the waste water influent and/or waste water effluent is controlled on the basis of the settled turbidity, separation efficiency in the settling vessel and/or settling velocity in the settling velocity in the settling vessel.

In an embodiment, the apparatus is configured to calculate the separation efficiency in the settling vessel based on a difference between the initial turbidity and the settled turbidity, calculate the settling velocity in the settling vessel by dividing the difference between the initial turbidity and the settled turbidity with the settling time, and control the dosing of the at least one coagulant and/or flocculant to the waste water influent on the basis of the calculated separation efficiency and/or the calculated settling velocity.

In an embodiment, the first optical measurer is configured to measure the UV absorbance at a single wave length or at a very narrow wave length range.

In an embodiment, the apparatus comprises a pH measurer to measure a pH value of the biologically treated waste water influent obtained from the secondary treatment, measure a pH value of the biologically and chemically treated waste water influent downstream from the secondary treatment and upstream from the tertiary treatment, measure a pH value of the waste water effluent obtained from the tertiary treatment, and/or measure a pH value of a clarified portion of a settled waste water sample in a settling vessel, wherein the controller is configured to control the dosing of at least one pH adjustment chemical to the waste water influent and/or waste water effluent on the basis of a measured pH value.

In an embodiment, the apparatus may comprise a remote apparatus for remotely monitoring, controlling and optimizing the dosing of the chemicals.

In an embodiment, the apparatus is used to perform the method steps.

In an embodiment, a waste water treatment system is disclosed, comprising said apparatus.

In an embodiment, the method comprises determining a value of at least one key variable selected from generation of solids in coagulation, settling efficiency (NTU), settling speed (NTU/min), comparison of separation efficiency in a settling vessel and full scale separation efficiency, effect of coagulant dosing on pH, hard COD coagulation, hard COD removal confirmation, hard COD coagulation confirmation, hard COD coagulation divided by generated turbidity, and/or hard COD coagulation divided by total COD value of removed lignin like material, and controlling the dosing of at least one coagulant, flocculant and/or other waste water treatment chemical to the waste water effluent and/or influent based the determined value of the at least one key variable.

Thus an embodiment discloses an online method and an online apparatus for monitoring and controlling the concentration of dissolved organics in a waste water treatment system, wherein the effect of chemical doses is measured automatically. The method and apparatus are used for monitoring and controlling removal of dissolved organics from the waste water stream. The method and apparatus enable monitoring and controlling hard COD in the waste water effluent.

In an embodiment, UV, pH and/or turbidity measurements may also be utilized for colour removal (e.g. for the removal of fulvic acids, humic acids) in raw water treatment, and phosphorus removal in waste water treatment. The method may further comprise measuring the concentration of dissolved phosphorus in a waste water influent, clarified portion of a settled sample and/or waste water effluent, and controlling the dosing of at least one coagulant to the waste water influent on the basis of the measured concentration of dissolved phosphorus. In addition/alternatively the method may further comprise measuring a total phosphorus concentration in a waste water influent, clarified portion of a settled sample and/or waste water effluent, and controlling the dosing of at least one coagulant to the waste water influent on the basis of the measured total phosphorus concentration.

The method may further comprise measuring the concentration of dissolved and total phosphorus in a waste water influent, clarified portion of a settled sample and/or waste water effluent, and controlling the dosing of at least one coagulant to the waste water influent on the basis of the measured concentration of dissolved and/or total phosphorus.

The method and system for monitoring and controlling organics removal in waste water streams is an online monitoring and control system involving UV absorbance probes, turbidity sensors, a settling unit and required control algorithms. UV absorbance at a single wave length within 200-400 nm, preferably within 250-350 nm, (or at a very narrow wave length range) is measured from the waste water to monitor the concentration of dissolved organics (i.e. hard COD) which are typically the main impurity component of biologically treated waste water in pulp and paper industry.

Figure 8:
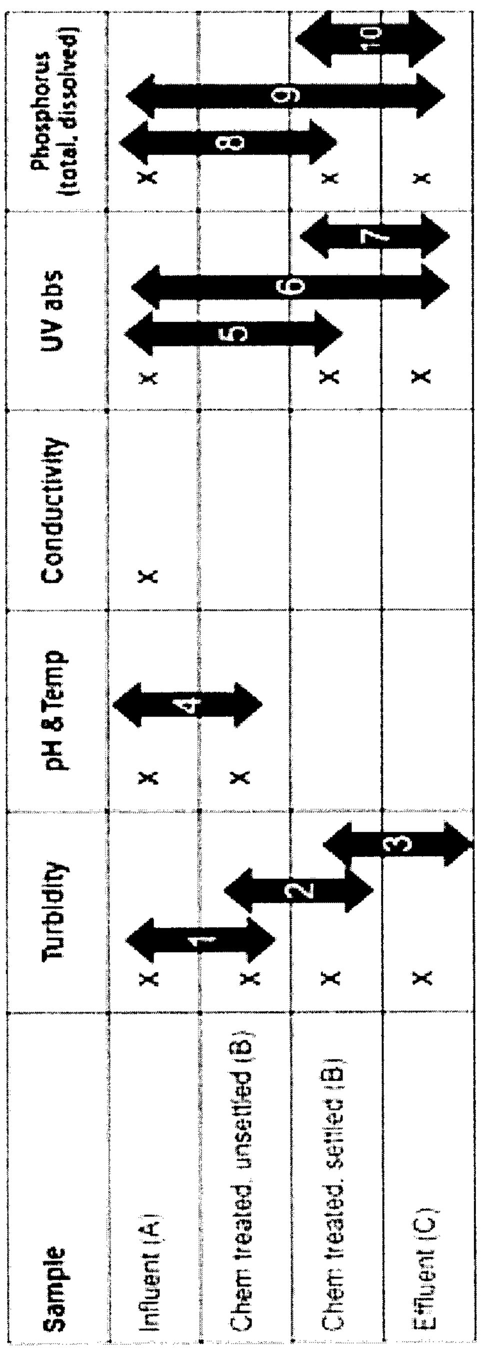
FIG. 8 illustrates possible measurements and key variables used for various influents and/or effluents.

A total COD value may be estimated and/or predicted based on dissolved organics concentration, hard COD value, UV absorbance, turbidity, and/or other water quality measurements. These measurements may be complemented by conductivity and temperature measurements. FIG. 8 shows possible measurements and key variables used for various waste water influents, chemically treated influent(s) (unsettled, settled) and/or effluents (after solid separation).

The following key variables may be calculated (numbers (1)-(10) refer to the numbers 1-10 of FIG. 8):

Generation of solids in coagulation (1) (difference between turbidity in biologically treated waste water influent and biologically and chemically treated waste water influent), Settling efficiency (NTU) and/or settling speed (NTU/min) (2) (difference between settled turbidity (=end turbidity) in biologically and chemically treated influent and turbidity in effluent), Comparison of solid separation in online system and full-scale unit (3), Coagulant dose effect on pH (4), Hard COD coagulation (5) (removed hard COD (removed lignin like material)), Hard COD removal confirmation (6) ("6" should give the same result as "5" to confirm "5", i.e. to confirm the operation of the settling vessel), Hard COD coagulation confirmation (7) (the difference between the UV absorbance of the settled sample and the UV absorbance of the effluent should be close to zero to confirm that the UV absorbance of the settled sample is about the same as the UV absorbance of the effluent, to confirm the operation of the settling vessel), Phosphorus coagulation (8) (removed phosphorus), Phosphorus removal confirmation (9) ("9" should give the same result for dissolved phosphorus as "8" to confirm "7", i.e. to confirm the operation of the settling vessel), Phosphorus coagulation confirmation (10) (the difference between the dissolved phosphorus of the settled sample and the dissolved phosphorus of the effluent should be close to zero to confirm that the dissolved phosphorus of the settled sample is about the same as the dissolved phosphorus of the effluent, to confirm the operation of the settling vessel).

The following key variables may be calculated based on ratio:

5/1=Hard COD coagulation divided by generated turbidity (increase of turbidity caused by hard COD coagulation), 5/2=Hard COD coagulation divided by separated solid (share of hard COD in separated solid), 8/1=Phosphorus coagulation divided by generated turbidity (increase of solid bound phosphorus by coagulation), 8/2=Phosphorus coagulation divided by separated solid (share of phosphorus in separated solid).

The dosing of coagulant to the waste water may be controlled based on following measurement/key variables:

UV absorbance in tertiary treated water (=effluent, output),

Estimated hard COD concentration (mg/l or kg/day) in effluent or settled sample, Estimated total COD concentration (mg/l or kg/day) in effluent or settled sample, Removed COD (mg/l or kg/day) in tertiary treatment or in secondary treatment.

Optional control parameters for the coagulant control (e.g. by using a feedforward controller or cascade loop in FB controller) include:

Generated turbidity, separation efficiency (2), end turbidity (turbidity in chemically treated waste water effluent, settled turbidity), UV absorbance in secondary treated water (incoming COD load, as 1/m or mg/l, kg/day)

Other incoming water quality parameters such as conductivity, temperature, pH,

Hard COD removal confirmation (6) ("6" should give the same result as "5" to confirm "5", to confirm the operation of the settling vessel), Hard COD coagulation confirmation (7) (the difference between the UV absorbance of the settled sample and the UV absorbance of the effluent should be close to zero to confirm that the UV absorbance of the settled sample is about the same as the UV absorbance of the effluent, to confirm the operation of the settling vessel), Phosphorus from effluent (tertiary treated water) and/or influent (secondary treated water), The controller may operate by using a feedback, feedforward and/or multiparameter model (output=coagulant dose) depending on process delays (sedimentation, flotation).

The dosing of the polymer (flocculant) may be controlled based on following measurements/key variables:

Solid separation efficiency (2),

Turbidity in chemically treated, settled waste water,

Turbidity in tertiary treated waste water.

Optional control parameters for controlling the dosing of the polymer (flocculant) include:

Comparison of solid separation in an online system and full-scale unit (3).

The controller may operate by using a feedback, feedforward and/or multiparameter model (output=coagulant dose and/or flocculant dose) depending on process delays (sedimentation, flotation).

pH control (by using acid/base) may include control for coagulation pH and effluent pH, the inputs being the coagulation pH, coagulant dose effect on pH (4), and/or effluent pH.

Dosages of chemicals as well as COD, phosphorus and suspended solids removal efficiency may be optimized by means of the method.

A waste water treatment process typically includes a tertiary treatment step, and before that, a secondary sedimentation step. A sample of a waste water stream may be conducted after chemical addition but before a separation unit (i.e. tertiary treatment) online as a side stream to a small vessel simulating a tertiary treatment unit. Particles in chemically treated waste water are settled for a predetermined time the small vessel. Initial turbidity of the sample is measured. Turbidity may also be measured as a function of time during the settling. After the turbidity value does not change markedly any more in the small vessel, measurement of UV absorbance and turbidity is carried out from the top of the settling unit (i.e. the small vessel) after predetermined time (i.e. at the end of the settling period). Hard COD and/or the dissolved organics concentration is monitored on the basis of the measured UV absorbance based on a calibration equation or calibration curve. The total COD is monitored on the basis of UV absorbance (describes hard COD) and turbidity (describes COD of suspended solids). A calibration equation or curve may be used in the monitoring. Separation efficiency and settling velocity may be monitored on the basis of turbidity during predetermined time. Separation efficiency is the difference between the initial turbidity and settled turbidity, and settling velocity is the difference between the initial turbidity and settled turbidity divided by the settling time. The dose of coagulant chemical may be controlled on the basis of the UV absorbance, generated turbidity, estimated hard COD, and/or estimated total COD. The dose of flocculant chemical (i.e. polymer) may be controlled on the basis of the separation efficiency, settling velocity, and/or settled turbidity (end turbidity)

The terms hard COD or dissolved organics or dissolved organic material/substances are used herein to describe or refer to lignin like compounds that are not removable from pulp mill waste water by biological treatment of the waste water stream. Lignin like compounds include aromatic compounds having a molecular weight of about 1000 g/mol. Lignin building blocks include degraded lignin like compounds and have a molecular weight of about 300-500 g/mol. UV (ultra violet) absorbance measurement may be utilised for determining the amount of dissolved organic lignin like compounds in waste water.

The waste water may further include biopolymers (MW >>20 000 g/mol, hydrophilic, not UV absorbing), neutrals (MW<350 g/mol), and acids (MW <350 g/mol, aliphatic, low-molecular weight organic acids).

LC-OCD (liquid chromatography-organic carbon detector) and/or COD analysis may be used for quantitative analysis of NOM (natural organic matter) in water samples. However, LC-OCD is performed as a separate laboratory analysis and it is not applicable an automated online method. Herein LC-OCD (liquid chromatography-organic carbon detector) may be used when predetermining a calibration curve or calibration equation showing the relation between UV absorbance and the concentration of dissolved organics, which calibration curve or calibration equation may then be used for estimating the concentration of dissolved organics or hard COD based on the UV absorbance measured in the system. The calibration curve or calibration equation may be apparatus-specific or waste water treatment system specific.

The global industry is strongly reducing their fresh water in-take due to, among other things, the tightening environmental regulations surrounding COD, in many cases targeting to near zero COD in discharge. Easily degradable organic matter can be removed from waste water by standard biological waste water treatment methods. However, hard COD in the treated effluent often exceeds environmental limits set. This is the case especially in the production of bleached pulp, since during bleaching, lignin like material is removed from pulp to the waste water stream, thus increasing the hard COD value of the waste water stream. In existing measurement systems, frequent manual COD measurements are performed involving a two-hour digestion at high temperature under acidic conditions using hazardous chemicals.

An embodiment discloses a smart tool to monitor and optimize dissolved organics removal, which enables real time monitoring of hard COD and total COD, and real time optimization of chemicals dosage. This is especially advantageous when treating waste water originating from the production of bleached pulp. The monitoring enables stable effluent quality, meeting environmental release limits, smaller organic pollutant release to environment, improved process performance, efficient organics removal and solid separation, cost efficient chemical usage, controlling chemical doses on the basis of need, generation of customer reports, proactive problem solving of the process, and proactive maintenance of the online smart tool. The ability to predict chemical treatment of waste water in advance enables a fast reaction time, and long process delays can be avoided, and adjustments to chemical dosage can be done to avoid unwanted chemical treatment. An aim is to stabilise water quality, reach environmental discharge limits, and to gain cost savings through optimized coagulant consumption. The performed online measurements have good correlation soluble COD (hard COD) measured in laboratory. The method and apparatus measure UV absorbance to determine the amount of dissolved organic lignin like compounds.

In the dissolved organics removal from biologically treated waste water, chemical precipitation can operate in a wide organics removal efficiency range (20-85%, or even 20-95%). The organics removal target depends on the pulp mill, and issues to be considered include limit for COD in discharge, organics load, and effluent quality.

A typical tertiary treatment is based on chemical dosing and organics and phosphorus removal by using a filter, dissolved air flotation (DAF), or clarification. Tertiary treatment may also be a Fenton reaction treatment (addition of hydrogen peroxide with ferrous iron for oxidizing contaminants) with a separation unit (e.g. sedimentation unit) or any other oxidation reaction (e.g. treatment of waste water with ozone).

Examples of such chemicals include coagulants and flocculants. Inorganic coagulants may be used for solids removal which is typically enhanced with polymers (flocculants). A coagulant is an inorganic (anion/cation) or organic (polyelectrolyte) chemical, which neutralizes the negative or positive surface charge (destabilization) of the impurities, such as colloidal particles. (Water Treatment Handbook, Vol 1 and Vol 2, 1991, Degremont). Coagulants may typically be polymers or inorganic coagulants. Inorganic coagulants may be e.g. one or more of salts of aluminum, iron, magnesium, calcium, zirconium and zinc, or any combination thereof; preferably one or more of e.g. chlorides, and sulphates, and any combination thereof; and preferably calcium chloride, calcium sulphate, zinc chlorides, iron chlorides, iron sulphates, aluminium chlorides, and aluminium sulphates, and any combination thereof.

A flocculant or a flocculant aid may promote the formation of a floc. Flocculant may be an inorganic polymer (such as activated silica), a natural polymer (starch, alginate) or synthetic polymer (Water Treatment Handbook, Vol 1 and Vol 2, 1991, Degremont, Water Quality and Treatment, A Handbook of Community Water Supplies). Polymers may be cationic, anionic, nonionic, or amphoteric. Polymers may comprise e.g. polyacrylamide, polyamine, polydiallyldimethylammoniumchloride (polyDADMAC), melamine formaldehydes, natural polymers, natural polysaccharides, and cationic or anionic derivatives thereof, and any combination thereof; preferably the polymer is selected from polyacrylamide, polyamine and polyDADMAC, and any combinations thereof.

In addition to coagulants and/or flocculants, the performed measurements or calculations may be used to control the addition of any other chemicals to be added to the waste water at a desired location of the waste water treatment process.

Other control chemicals may comprise Fenton reaction treatment chemicals (e.g. hydrogen peroxide, ferrous iron), or oxidizing chemicals like hydrogen peroxide, ozone, peracids.

Measurements carried out in the settling vessel may include UV measurements, turbidity measurements, and optionally pH measurements. The settling time of the sample in the settling vessel may be about 10-30 min. Turbidity in NTU may be measured at t=0 s, and at t=x min (x=the end of settling time). The initial pH may be measured at t=0 s to determine whether the pH of the waste water is optimal. The UV absorbance is measured from the settled sample (clarified portion of the sample, i.e. from top part of the settling vessel). Measurement may be carried out by using a UV unit which takes a sample from the top part of the settling vessel at the end of settling time, or by using a UV absorbance sensor installed in settling vessel.

Figure 1A:
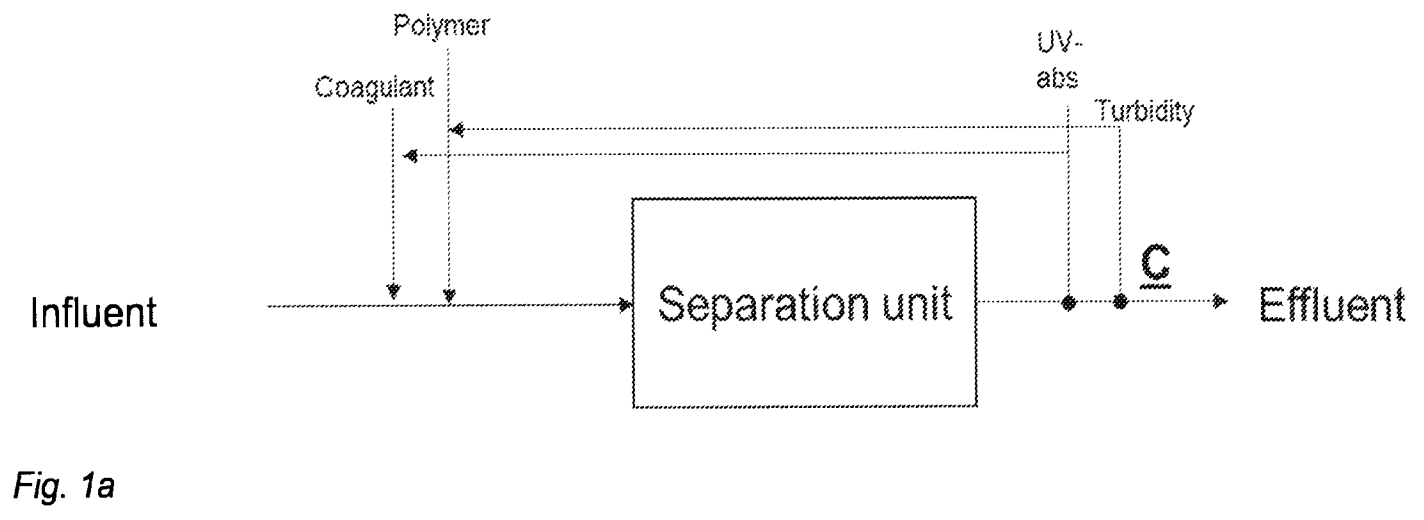

FIGS. 1*a*, 1*b*, 2*a*, 2*b*, 3*a*, 3*b*, 4*a*, 4*b* and 5 illustrate exemplary embodiments. In the embodiments, the measurements may take place in various points of the process stream.

In FIGS. 1*a*, 1*b*, 2*a* and 2*b*, measurement from waste water after secondary treatment (sedimentation), but before chemicals addition, is marked as a measurement point "A", measurement from waste water after chemicals addition, but before solid separation (tertiary treatment), is marked as a measurement point "B", and measurement from effluent (i.e. tertiary treated waste water) is marked as a measurement point "C". The chemicals are added to biologically treated waste water stream before or during the tertiary treatment.

In FIG. 1*a*, the dosing of the coagulant to the biologically treated waste water stream is controlled based on the UV absorbance and turbidity (direct measurements at location "C") measured from the effluent after the tertiary treatment. An increase in the UV absorbance indicates that the amount of organic matter has increased, wherein the coagulant dose needs to be increased. The polymer (flocculant) dosing is controlled based on the turbidity of the effluent. If the turbidity increases, the solid separation is weak and the more polymer is needed.

In FIG. 1*b*, the adjustment of the chemical dosage to the biologically treated waste water stream is enhanced by additional measurements at location "A". The large load of organic matter can be predicted based on a detected UV absorbance increase in the biologically treated waste water stream at location "A", i.e. the coagulant dose may be increased although it is not yet visible from the effluent at location "C". If there is a problem with the biological treatment, and the biologically treated waste water stream may contain biodegradable organic matter (which does not appear in the UV absorbance) at location "A", additional measurements of turbidity, conductivity, temperature (T) and pH may take place at location "A".

Figure 2A:
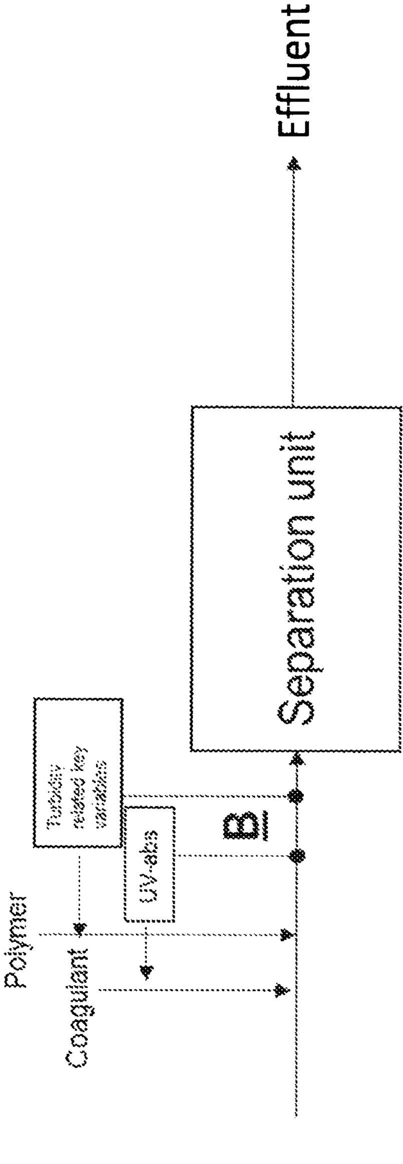

In FIG. 2*a*, the coagulant dosage to the biologically treated waste water stream is adjusted based on the UV absorbance, and optionally based on the turbidity, of the settled sample measured at location "B" from the settling vessel. The polymer dosage to the biologically treated waste water is controlled based turbidity key variables including end turbidity (i.e. turbidity in the chemically treated, settled sample) of the sample, and separation of solids in settling (i.e. separation efficiency) and/or settling speed of the sample.

Figure 2B:
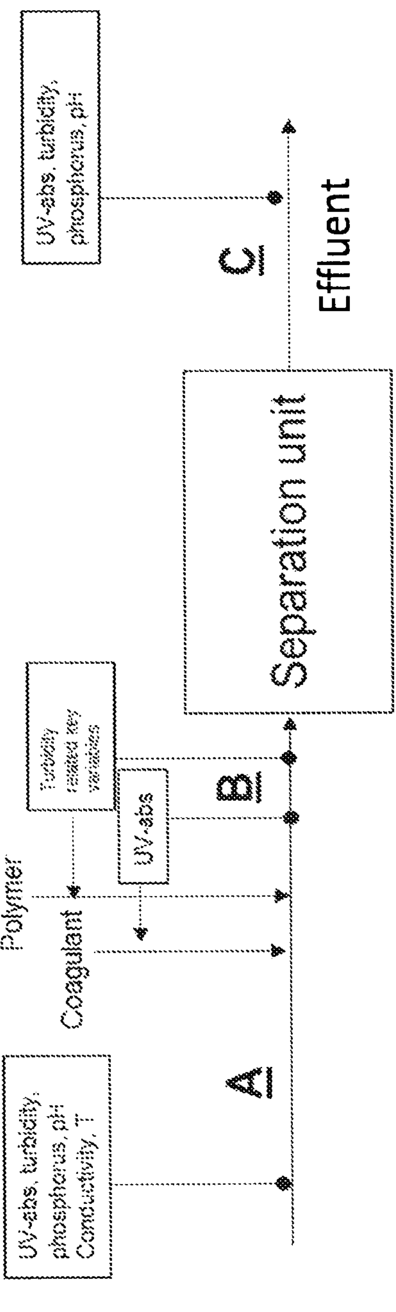

In FIG. 2*b*, the coagulant dosage to the biologically treated waste water stream is adjusted based on the UV absorbance of the settled sample, and optionally based on the turbidity key variables (1, 2, 3) and/or measurements at locations "C", "B" and/or "A" and/or key variable(s) 5, 6, 7, 5/1, 5/2. The polymer dosage to the biologically treated waste water stream is controlled based on turbidity key variable(s) including end turbidity (i.e. turbidity in the chemically treated, settled sample) of the sample, separation of solids in settling, settling speed, and/or generation of solids in coagulation. Optionally the polymer dosage is controlled based on turbidity at "C" and/or based on comparison of solid separation (i.e. settling efficiency) in the online system and full-scale unit.

In some water treatment plants there is no separate tertiary treatment step. FIGS. 3*a*, 3*b*, 4*a* and 4*b* illustrate waste water treatment systems where there is no separate tertiary treatment step/unit in the system. Instead of tertiary treatment, in FIGS. 3*a*, 3*b*, 4*a* and 4*b* the chemical treatment may be carried out in the sedimentation unit simultaneously to the secondary treatment. The chemicals are added to the biologically treated waste water stream before or during the secondary treatment.

Figure 3A:
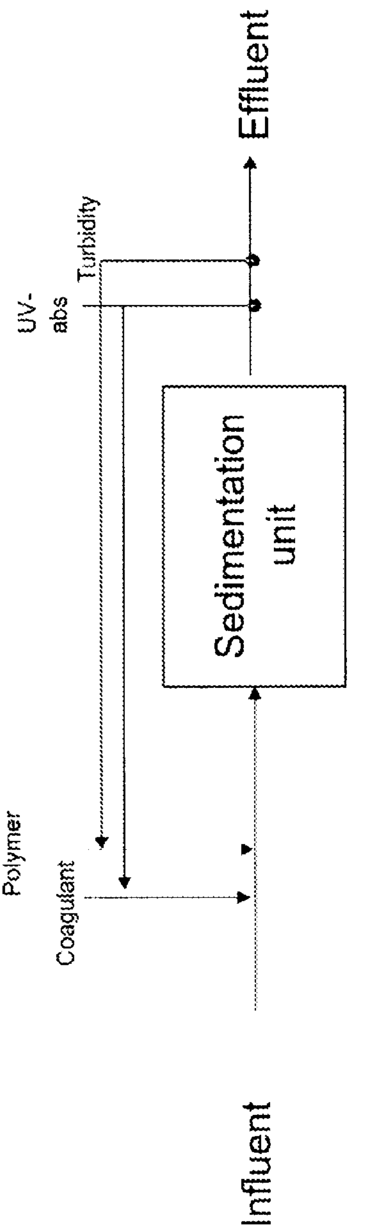

In FIG. 3*a*, the dosing of the coagulant to the biologically treated waste water stream is controlled based on the UV absorbance and turbidity of the effluent measured after the secondary treatment. An increase in the UV absorbance indicates that the amount of organic matter has increased, wherein the coagulant dose needs to be increased. The polymer (flocculant) dosing to the biologically treated waste water stream is controlled based on the turbidity of the effluent. If the turbidity of the effluent increases, the solid separation (i.e. separation efficiency) is weak and more polymer is needed.

Figure 3B:
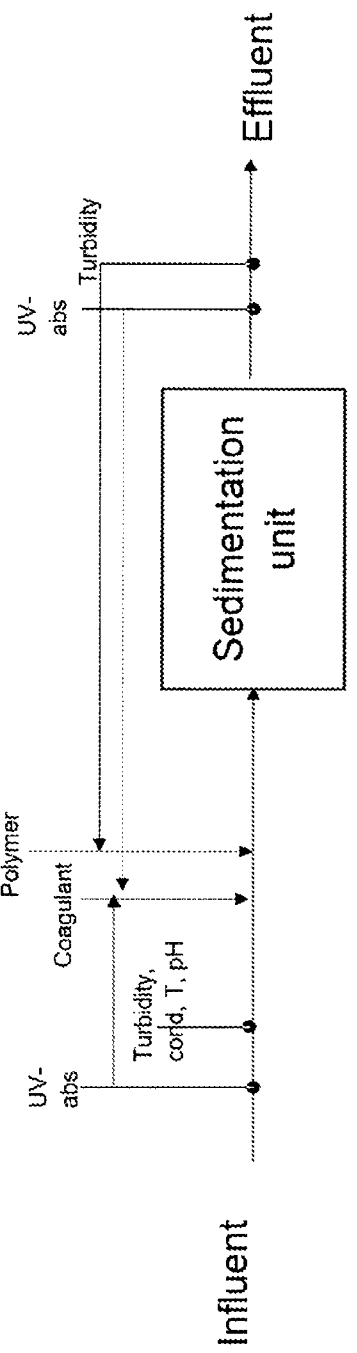

In FIG. 3*b*, the adjustment of the chemical dosage is enhanced by additional measurements before the chemical addition. The large load of organic matter can be predicted based on a detected UV absorbance increase in the biologically treated waste water stream, i.e. the coagulant dose may be increased although it is not yet visible from the effluent. If there is a problem with the biological treatment, and the biologically treated waste water stream may contain biodegradable organic matter (which does not appear in the UV absorbance), additional measurements of turbidity, conductivity, temperature (T) and pH may take place before the chemical addition.

Figure 4A:
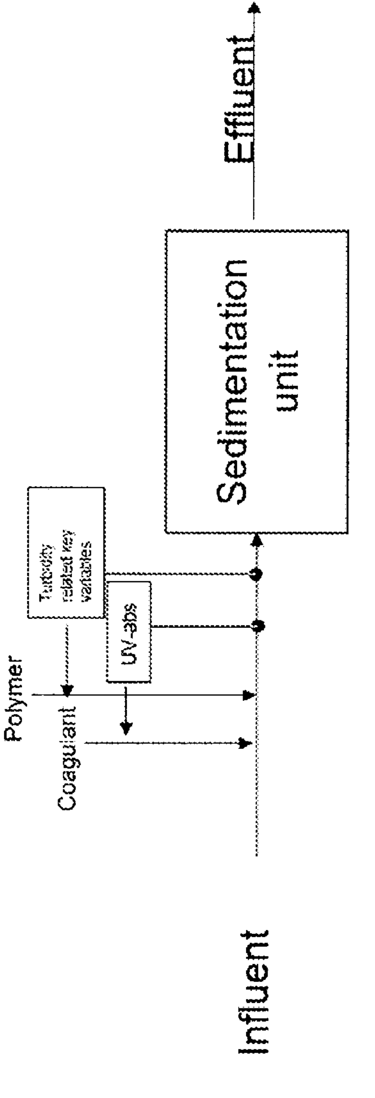

In FIG. 4*a*, the coagulant dosage is adjusted based on the UV absorbance of the settled sample, and optionally based on the turbidity of the settled sample, as measured from the settling vessel. The polymer dosage is controlled based turbidity key variables including end turbidity (i.e. turbidity in the chemically treated, settled sample) of the sample, and separation of solids in settling (i.e. separation efficiency) and/or settling speed of the sample. The sample is taken at a location before or during the secondary treatment and after the chemical addition.

Figure 4B:
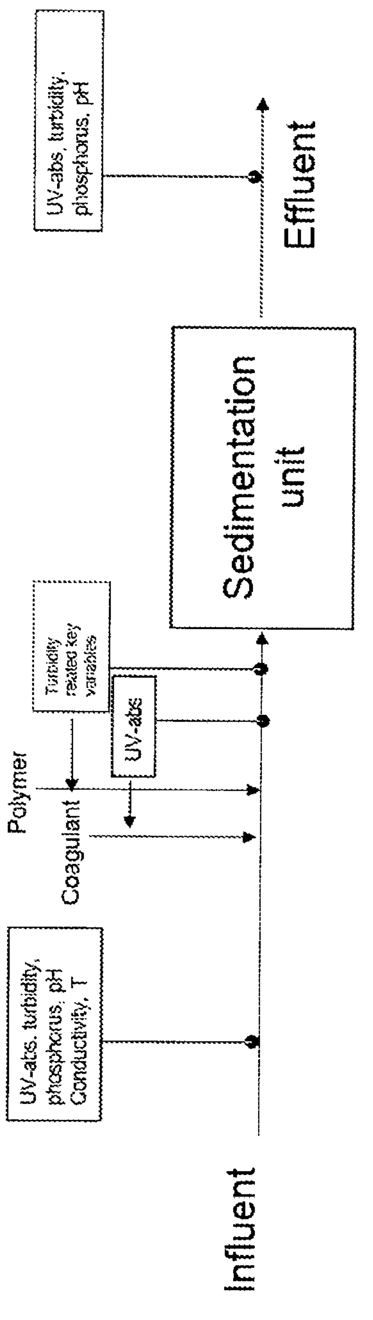

In FIG. 4*b*, the coagulant dosage is adjusted based on the UV absorbance of the settled sample, and optionally based on the turbidity key variables (1, 2, 3), based on measurements before chemical addition and/or from the effluent after the secondary treatment, and/or based on key variables 5, 6, 7, 5/1, 5/2. The polymer dosage is controlled based on turbidity key variables including end turbidity (i.e. turbidity in the chemically treated, settled sample) of the sample, separation of solids in settling, settling speed, and/or generation of solids in coagulation. Optionally the polymer dosage is controlled based on turbidity of the effluent and/or comparison of solid separation in the online system and full-scale unit.

Figure 5:
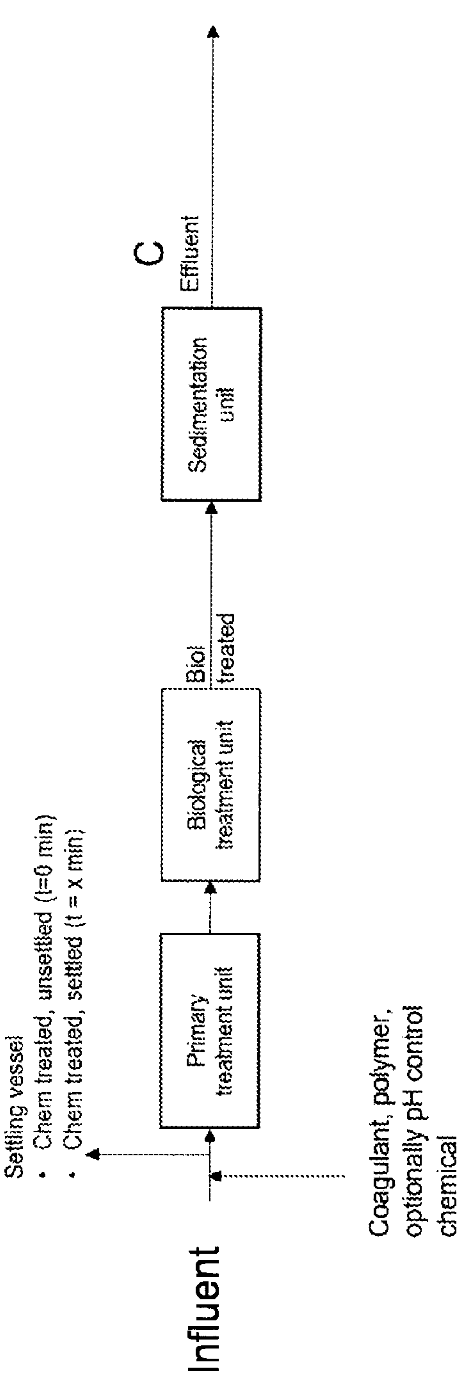

FIG. 5 illustrates a situation where there is no tertiary treatment in the waste water treatment system. In FIG. 5, the treatment chemicals are dosed to the waste water before primary sedimentation taking place before the biological treatment. The dosing may be based on UV absorbance measurement measured from the effluent ("C") (after secondary treatment), and/or from the settled sample in the settling vessel, taken from the waste water stream after the chemical addition and before the primary sedimentation. The dosing may also be based on the separation efficiency of the settling vessel.

Figure 6:
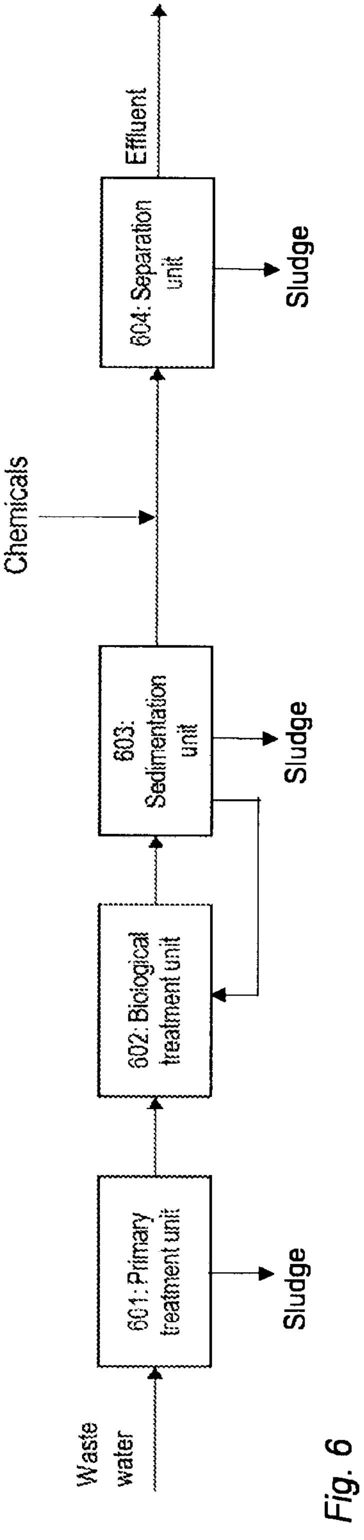
FIG. 6 illustrates an exemplary system.

FIG. 6 illustrates an exemplary waste water treatment system. It should be noted that FIG. 6 is a simplified representation of a waste water treatment system, and in reality the waste water treatment system may also include other functions, units and streams not shown in FIG. 6. In FIG. 6, a waste water stream is fed to a primary treatment unit 601 for the removal of sludge (including larger particles such as fibers etc.) from the waste water e.g. by settling or filtration. Before the primary treatment 601, the waste water may have been subjected to mechanical pretreatment (not shown in FIG. 6) e.g. by screening to remove any large objects from the waste water. The primarily treated waste water is fed to a biological treatment unit (e.g. a bioreactor) 602 for the biological treatment. The biologically treated waste water is then subjected to secondary treatment in a sedimentation unit 603 to further remove solids-containing sludge from the waste was ter. After that chemicals may be added to the biologically treated waste water stream to obtain a biologically and chemically treated waste water stream to be fed to the separation unit 604. Alternatively the chemicals may be added to waste water in the separation unit 604. As a result of the tertiary treatment in the separation unit 604, a treated waste water effluent is obtained as well as sludge containing organic solids separated from the water. It is also possible that there is no tertiary treatment 604 in the system; in that case chemicals may be added before the secondary treatment 603. It is also possible to add chemicals before the primary treatment 601. UV and other measurements from the process streams may take place at different parts of the system as described in FIGS. 1*a*, 1*b*, 2*a*, 2*b*, 3*a*, 3*b*, 4*a*, 4*b* and 5.

In relation to FIG. 6, measurements ("A") may be carried out from the waste water influent before chemical additions, i.e. from the secondarily treated waste water, from the biologically treated waste water before solid separation, from inlet waste water, and/or from internal process water streams. Further, in relation to FIG. 6, measurements ("B") may be carried out from the waste water influent after chemical additions, but before solid separation. Yet further, in relation to FIG. 6, measurements ("C") may be carried out from the waste water effluent after solid separation.

In an embodiment, a pulp mill waste water treatment may be monitored by using an online UV absorbance sensor or probe which may be submersible or configured to measure a side flow, and which utilises a single UV wave length or narrow wave length range for the measurement of the selected UV absorbance. The instrument measures in-situ, directly in the process. It may display and/or communicate the result in real time. The measurement takes place directly in-situ. Thus, measurement errors due to transport, storage, dilution etc. are not relevant. A single measurement may take less than 1 second. The entire measurement procedure is controlled by on-board electronics. Dissolved organic substances such as lignin like organic compounds cause absorbance at specific wavelengths.

Turbidity refers to the cloudiness or haziness of a fluid caused by large numbers of individual particles that may be invisible to the naked eye. Turbidity is a measure of water quality. Fluids such as waste water may contain suspended solid matter containing particles of different sizes. Some suspended material is large and heavy enough to settle to the bottom of a container if the water is left to settle, and very small particles settle only very slowly or not at all if the water is regularly agitated or the particles are colloidal. These small solid particles cause the water to appear turbid. The tendency of particles to scatter a light beam focused on them may be utilized to measure turbidity in water. For example, turbidity may be measured this way by using an optical instrument called a nephelometer including a detector and a source of light beam. More light reaches the detector if there are lots of small particles than if there are few. The nephelometer measures turbidity in nephelometric turbidity units (NTU).

In an embodiment, turbidity is measured by an optical measurer (such as a nephelometer), and the obtained turbidity values are expressed in nephelometric turbidity units (NTU).

UV absorbance measurement may be used for the quantitative determination of dissolved organics in the waste water influent and/or waste water effluent. The UV absorbance of the water is directly proportional to the concentration of the absorbing contaminants (UV active compounds, in this case the dissolved organic matter (hard COD)) in the water. Thus, UV absorbance measurement can be used to determine the concentration of the absorber in water. In an embodiment, UV absorbance is measured by an optical measurer (a UV absorbance probe or sensor such as a UVAS plus SC sensor from HACH Lange Ltd), and the obtained UV absorbance value is compared to the calibration curve to determine the concentration of dissolved organics, or the obtained UV absorbance value is inserted to the calibration equation to determine/estimate the concentration of dissolved organics.

An exemplary monitoring and controlling method and apparatus may be applied in the treatment of waste water from a pulp production process, including waste water from a kraft pulp process, mechanical pulp process, and recovered fiber process.

An exemplary monitoring and controlling method and apparatus may also be used in the treatment of municipal waste water to remove organic matter and micropollutants.

An exemplary monitoring and controlling method and apparatus may further be applied to the treatment of raw water.

Hard COD contains organic aromatic compounds originating from plants, including wood-based material (lignin), and/or soil-based material (humic acid, fulvic acid).

An exemplary monitoring and controlling method and apparatus enable measuring the effect of control chemicals in chemical waste water treatment by using a small-scale device, before the effect of the control chemicals is apparent from the actual waste water treatment process. The effect of the chemical treatment may be measured with the small-scale device as an on-line measurement.

An exemplary method and apparatus may be used for monitoring and controlling the addition of Fenton chemicals (ferrous iron (e.g. iron(II) sulphate), hydrogen peroxide and acid) in chemical waste water treatment by using a small-scale device (e.g. settling device), before the effect of the Fenton chemicals is apparent from the actual waste water treatment process (e.g. sedimentation unit). The effect of the chemical treatment may be measured with the small-scale device (e.g. settling device) as an on-line measurement.

An exemplary method and apparatus may be used for monitoring and controlling the oxidation reaction in chemical waste water treatment by using a small-scale device, before the effect of the control chemicals is apparent from the actual waste water treatment process. The apparatus may be, for example, a small reactor which utilizes the oxidation reaction, e.g. ozone treatment. The oxidation reaction with ozone or other oxidizing chemical is used for removal of dissolved organic compounds.

An exemplary method and apparatus may be used for monitoring and controlling coagulant dosing in a sedimentation system, wherein the effluent is sampled for online measurement of dissolved organic matter. The apparatus may be, for example, a small reactor which utilizes chemical or physical reaction, e.g. ozone treatment.

Determining the hard COD concentration (instead of merely determining the total organics concentration) enables hard COD to be effectively removed from the waste water stream by coagulant(s). The on-line determination of the hard COD concentration in accordance with an exemplary embodiment enables the coagulant(s) dosing or other control chemical(s) dosing to be optimized for the removal of hard COD from the waste water stream.

Hard COD concentration in the waste water stream and the share of hard COD from the total COD in the waste water stream depends on which part of the waste water treatment the sample to be analysed/measured is taken from. From the total COD in the waste water stream, typically more than 90 wt-% is hard COD after the biological treatment.

Example 1

Figure 7:
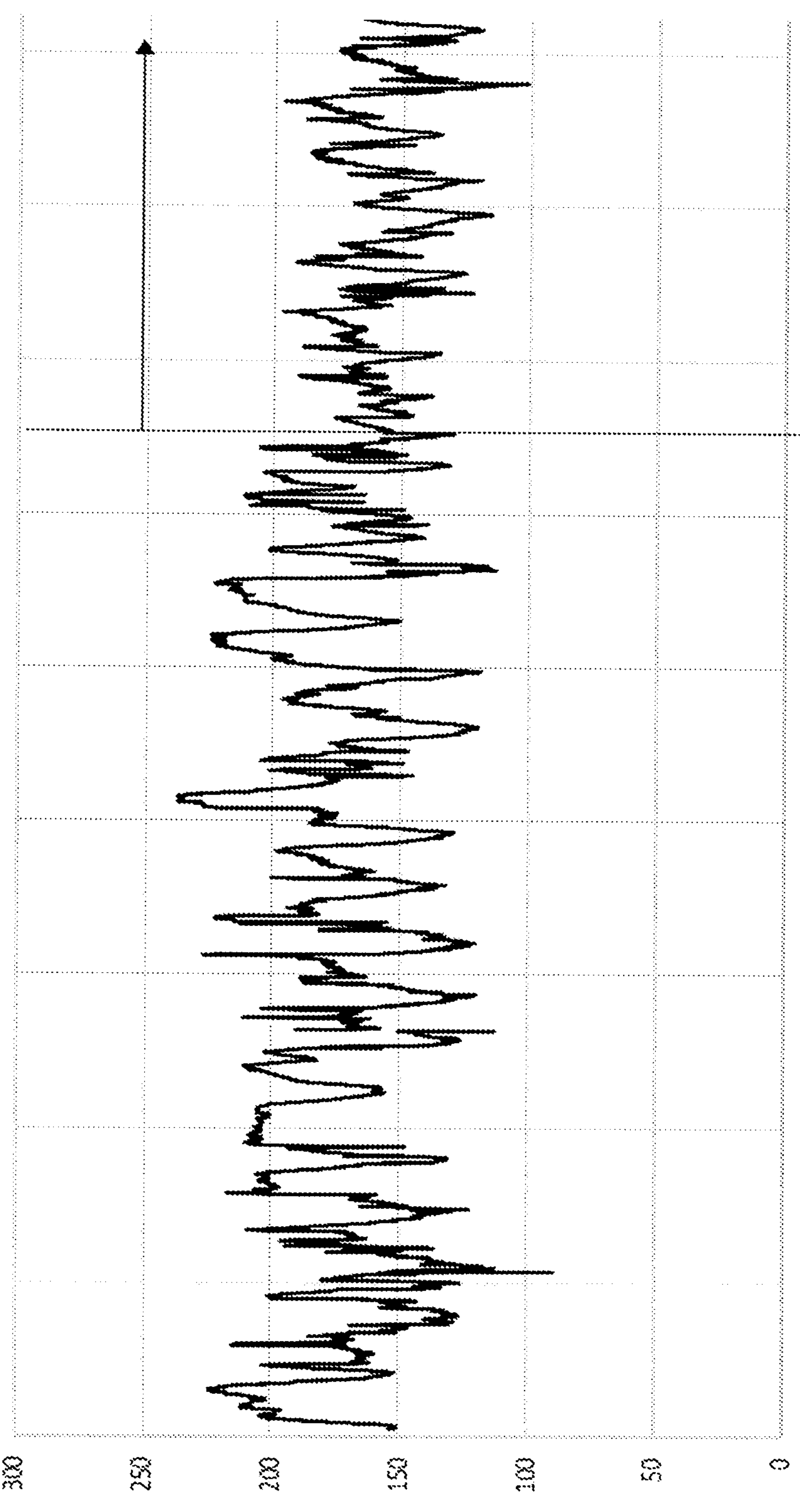
FIG. 7 illustrates exemplary monitoring and controlling of COD content.

FIG. 7 shows an example of monitoring COD concentration (mg/L) in purified waste water after chemical treatment and separation unit for a period of 6 months. Before the chemical treatment the waste water was subjected to biological treatment. The waste water originated from a pulp mill. The vertical line (*) indicates the time point after which the chemical addition was controlled by the method and apparatus of the invention. Samples were taken to the apparatus containing a settling vessel (2 liters) from 1) chemically treated waste water before the separation unit, from 2) biologically treated waste water before chemical treatment, and from 3) purified waste water after chemical treatment and the separation unit. UV absorbance and turbidity were measured from samples 2) and 3) without settling of the sample (direct measurement). Turbidity was measured from sample 1) before and after settling of the sample in the settling vessel. UV absorbance was measured from a clarified portion of sample 1) after a settling time. These values were used for automatic control of coagulant and flocculant dosing to the biologically treated waste water. As shown in FIG. 7, when the control method and apparatus of the invention were used, the COD concentration was kept below 200 mg/L which is the environmental limit for the COD concentration of purified waste water (effluent).

It will be obvious to a person skilled in the art that, as the technology advances, the inventive concept can be implemented in various ways. The invention and its embodiments are not limited to the examples described above but may vary within the scope of the claims.

The invention claimed is:

1. A method for monitoring and controlling treatment of a municipal waste water stream, or an industrial waste water stream, wherein the treatment involves subjecting the waste water stream to both at least one biological treatment step in a bioreactor followed by a solids separation unit, and at least one chemical treatment step, the method comprising:

conducting a sample of waste water biologically treated in the bioreactor online as a side stream to a settling vessel;

allowing particles in the sample to settle in the settling vessel for a selected settling time;

measuring UV absorbance from the biologically treated waste water influent or waste water effluent of the solids separation unit after the biological treatment step, wherein the UV absorbance is measured after the selected settling time for the settled sample in a clarified portion of the sample;

determining a concentration of dissolved organics and a concentration of hard COD in the waste water influent or waste water effluent based on measured UV absorbance;

controlling dosing of at least one coagulant and/or other control chemical to the waste water influent based on the measured UV absorbance, the determined concentration of the dissolved organics and the determined concentration of hard COD.

2. A method as claimed in claim 1, comprising measuring turbidity of the waste water influent and/or waste water effluent, controlling dosing of at least one coagulant and/or other control chemical to the waste water influent based on the measured turbidity; and controlling dosing of at least one flocculant to the waste water influent based on the measured turbidity.

3. A method as claimed in claim 2, wherein the measuring of the UV absorbance and turbidity takes place from waste water effluent obtained from a tertiary treatment in a separation unit of a biologically and chemically treated waste water influent; and wherein the dosing of the at least one coagulant and optionally the dosing of the at least one flocculant takes place downstream from a secondary treatment in a sedimentation unit of a biologically treated waste water influent and upstream from the tertiary treatment.

4. A method as claimed in claim 3, wherein the method comprises:

measuring a pH value of the biologically treated waste water influent obtained from the secondary treatment;

measuring a pH value of a biologically and chemically treated waste water influent downstream from the secondary treatment and upstream from the tertiary treatment;

measuring a pH value of the waste water effluent obtained from the tertiary treatment;

measuring a pH value of the waste water effluent obtained from the secondary treatment; and/or measuring a pH value of a clarified portion of a settled waste water sample in a settling vessel; and controlling the dosing of at least one pH adjustment chemical and/or coagulant to the waste water influent and/or waste water effluent based on a measured pH value.

5. A method as claimed in claim 2, wherein the measuring of the UV absorbance and turbidity takes place from waste water influent obtained from a secondary treatment in a sedimentation unit of a biologically treated waste water influent; and wherein the dosing of the at least one coagulant and optionally the dosing of the at least one flocculant takes place downstream from the secondary treatment and upstream from a tertiary treatment in a separation unit of a biologically and chemically treated waste water influent.

6. A method as claimed in claim 2, wherein the measuring of the UV absorbance and turbidity takes place from waste water effluent obtained from a secondary treatment in a sedimentation unit of a biologically and chemically treated waste water influent;

wherein the dosing of the at least one coagulant and optionally the dosing of the at least one flocculant takes place upstream from the secondary treatment.

7. A method as claimed in claim 1, wherein the sample is biologically and chemically treated waste water influent, and the method comprises:

measuring turbidity of the sample to obtain an initial turbidity value prior to allowing particles in the sample to settle in the settling vessel for the selected settling time;

after the selected settling time, measuring UV absorbance and settled turbidity from a clarified portion of the sample;

determining a concentration of dissolved organics in the clarified portion of the sample based on the measured UV absorbance;

controlling dosing of at least one coagulant to the waste water influent based on the measured UV absorbance and/or the determined concentration of the dissolved organics, and optionally based on the settled turbidity; and optionally controlling dosing of at least one flocculant to the waste water influent based on the settled turbidity, a separation efficiency in the settling vessel, and/or a settling velocity in the settling vessel.

8. A method as claimed in claim 7, wherein the sample is conducted from a point located downstream from a secondary treatment in a sedimentation unit of a biologically treated waste water influent, and upstream from a tertiary treatment in a separation unit of the biologically and chemically treated waste water influent;

wherein the dosing of the at least one coagulant and optionally the dosing of the at least one flocculant takes place downstream from the secondary treatment and upstream from the point from where the sample is conducted to the settling vessel.

9. A method as claimed in claim 7, wherein the method comprises:

calculating a separation efficiency in the settling vessel based on a difference between the initial turbidity and the settled turbidity;

calculating a settling velocity in the settling vessel by dividing the difference between the initial turbidity and the settled turbidity with the settling time; and controlling the dosing of the at least one coagulant and/or flocculant to the waste water influent based on the calculated separation efficiency and/or the calculated settling velocity.

10. A method as claimed in claim 9, wherein the method comprises:

estimating a separation efficiency of the separation unit based on the calculated separation efficiency in the settling vessel and/or the calculated settling velocity in the settling vessel.

11. A method as claimed in claim 7, wherein the method comprises:

predetermining a correlation factor or function between the settled turbidity in the settling vessel and the turbidity of the waste water effluent; and predicting the turbidity of the waste water effluent based on the settled turbidity measured from the settling vessel, by using the predetermined correlation factor or function.

12. A method as claimed in claim 7, wherein the particles in the sample are allowed to settle in the settling vessel such that the turbidity of the sample does not change markedly any more after the selected settling time.

13. A method as claimed in claim 1, wherein the measuring of the UV absorbance takes place from biologically treated waste water influent upstream from a secondary treatment in a sedimentation unit of a biologically treated waste water influent and upstream from the dosing of the coagulant and flocculant, wherein the dosing of the at least one coagulant and optionally the dosing of the at least one flocculant takes place upstream from the secondary treatment.

14. A method as claimed in claim 1, wherein the method comprises:

conducting a sample of a biologically and chemically treated waste water influent to a settling vessel;

measuring turbidity of the sample to obtain an initial turbidity value;

allowing particles in the sample to settle in the settling vessel for a selected settling time;

after the selected settling time, measuring UV absorbance and settled turbidity from a clarified portion of the sample;

determining the concentration of dissolved organics in the clarified portion of the sample based on the measured UV absorbance;

controlling the dosing of at least one coagulant to the waste water influent based on the measured UV absorbance and/or the determined concentration of the dissolved organics, and optionally based on the settled turbidity; and optionally controlling the dosing of at least one flocculant to the waste water influent based on the settled turbidity, a separation efficiency in the settling vessel, and/or a settling velocity in the settling vessel, wherein the sample is conducted from a point located upstream from a secondary treatment in a sedimentation unit of a biologically treated waste water influent, and downstream from the dosing of the coagulant and flocculant; and wherein the dosing of the at least one coagulant and optionally the dosing of the at least one flocculant takes place upstream from the secondary treatment and upstream from the point from where the sample is conducted to the settling vessel.

15. A method as claimed in claim 1, wherein the method comprises:

predetermining a calibration equation or calibration curve between UV absorbance and the concentration of dissolved organics; and determining a concentration of the dissolved organics, based on the measured UV absorbance, by using the predetermined calibration equation or by comparing the measured UV absorbance to the predetermined calibration curve.

16. A method as claimed in claim 1, wherein the UV absorbance is measured at a single wave length or at a narrow wave length range.

17. A method as claimed in claim 1, wherein the method comprises:

determining a total organic matter concentration in the waste water influent and/or effluent based on the measured UV absorbance, the determined concentration of the dissolved organics and/or the turbidity of the waste water influent and/or effluent.

18. A method as claimed in claim 1, wherein it is a continuous method, an automated method and/or a computerized method.

19. A method as claimed in claim 1, wherein the method comprises:

monitoring and controlling treatment of the waste water stream with an apparatus having:

a first optical measurer configured to measure UV absorbance of the waste water influent or waste water effluent;

a processor configured to determine the concentration of dissolved organics in the waste water influent or waste water effluent based on the measured UV absorbance; and a controller configured to control the dosing of at least one coagulant and/or other control chemical to the waste water influent based on the measured UV absorbance and/or the determined concentration of the dissolved organics.

20. A method as claimed in claim 19, comprising monitoring and controlling treatment of the waste water stream with an apparatus having:

a second optical measurer configured to measure turbidity of the waste water influent and/or waste water effluent;

a controller configured to control the dosing of at least one coagulant and/or other control chemical to the waste water influent based on the measured turbidity, and control the dosing of at least one flocculant to the waste water influent based on the measured turbidity.

21. A method as claimed in claim 1, wherein the method comprises:

determining a value of at least one key variable selected from:

generation of solids in coagulation, settling efficiency (NTU), settling speed (NTU/min), comparison of separation efficiency in a settling vessel and full scale separation efficiency, effect of coagulant dosing on pH, hard COD coagulation, hard COD removal confirmation, hard COD coagulation confirmation, hard COD coagulation divided by generated turbidity, and/or hard COD coagulation divided by total COD value of removed lignin like material; and wherein the method comprises controlling the dosing of at least one coagulant, flocculant and/or other waste water treatment chemical to the waste water effluent and/or influent based on the determined value of the at least one key variable.

22. A method as claimed in claim 1, wherein the method comprises:

measuring the concentration of dissolved phosphorus in a waste water influent and/or waste water effluent; and controlling the dosing of at least one coagulant to the waste water influent based on the measured concentration of dissolved phosphorus.

23. A method as claimed in claim 1, wherein the method comprises:

measuring a total phosphorus concentration in a waste water influent and/or waste water effluent; and controlling the dosing of at least one coagulant to the waste water influent based on the measured total phosphorus concentration.

24. A method as claimed in claim 1, wherein the method comprises:

optimizing dosages of chemicals; and/or optimizing COD, phosphorus and/or suspended solids removal efficiency.

25. A method as claimed in claim 1, wherein said treatment further comprises a primary treatment step in a primary treatment unit.

26. A method as claimed in claim 25, wherein the biological treatment unit follows the primary treatment step.

27. A method as claimed in claim 25, wherein the primary treatment unit is for removal of sludge.

28. A method as claimed in claim 1, wherein the solids separation unit following the bioreactor is a sedimentation unit.

29. A method as claimed in claim 1, wherein the chemical treatment step following the biological treatment step comprises dosing at least one coagulant to a waste water influent of the solids separation unit.

30. A method as claimed in claim 29, comprising measuring the UV absorbance and turbidity from the waste influent or waste water effluent of the solids separation unit after the biological treatment step and the dosing of the at least one coagulant.

* * * * *